US012605593B2

(12) United States Patent
Chang et al.

(10) Patent No.: US 12,605,593 B2
(45) Date of Patent: Apr. 21, 2026

(54) IMAGE ANALYSIS METHOD FOR SENSING MOVING BALL, AND SENSING DEVICE USING SAME

(71) Applicant: GOLFZON CO., LTD., Seoul (KR)

(72) Inventors: Soo Ho Chang, Seoul (KR); Myeong Jin Lee, Seoul (KR); Tae Suk Ko, Seoul (KR)

(73) Assignee: GOLFZON CO., LTD., Seoul (KR)

( * ) Notice: Subject to any disclaimer, the term of this patent is extended or adjusted under 35 U.S.C. 154(b) by 267 days.

(21) Appl. No.: 18/578,734

(22) PCT Filed: Jul. 8, 2022

(86) PCT No.: PCT/KR2022/009932
§ 371 (c)(1),
(2) Date: Jan. 12, 2024

(87) PCT Pub. No.: WO2023/003237
PCT Pub. Date: Jan. 26, 2023

(65) Prior Publication Data
US 2024/0382804 A1 Nov. 21, 2024

(30) Foreign Application Priority Data

Jul. 22, 2021 (KR) ........................ 10-2021-0096145

(51) Int. Cl.
G06T 7/20 (2017.01)
A63B 24/00 (2006.01)
(Continued)

(52) U.S. Cl.
CPC .......... A63B 24/0021 (2013.01); G06T 7/215 (2017.01); G06T 7/285 (2017.01);
(Continued)

(58) Field of Classification Search
CPC ........ A63B 24/0021; A63B 2024/0034; A63B 2102/32; A63B 2220/05; A63B 2220/807;
(Continued)

(56) References Cited

U.S. PATENT DOCUMENTS 5,342,051 A * 8/1994 Rankin .............. A63B 24/0021
473/409
5,798,519 A * 8/1998 Vock ................... A63B 69/3658
250/206.1
(Continued)

FOREIGN PATENT DOCUMENTS

KR 10-0953132 B1 4/2010
KR 10-1244044 B1 3/2013
(Continued)

OTHER PUBLICATIONS

International Search Report for PCT/KR2022/009932 mailed Oct. 26, 2022 from Korean Intellectual Property Office.

*Primary Examiner* — Aaron W Carter
(74) *Attorney, Agent, or Firm* — Revolution IP, PLLC

(57) ABSTRACT

The present invention is to provide an image analysis method for sensing moving ball, and sensing device using same significantly improving the speed of image processing by performing image analysis by applying an analysis object area set immediately before each acquired image to the current image according to a method that setting an analysis object area, which is a partial area, without analyzing the entire image in analyzing an image for sensing a moving ball in sports with balls, detecting the ball within the set analysis object area, calculating the physical quantity of the ball movement, and setting another analysis object area to include the position where the ball will appear on the image to be analyzed based on the position of the ball detected on the image being analyzed.

12 Claims, 7 Drawing Sheets

(51) Int. Cl.

| | | |
|---|---|---|
| *G06T 7/215* | (2017.01) | |
| *G06T 7/285* | (2017.01) | |
| *G06V 10/764* | (2022.01) | |
| *G06V 20/64* | (2022.01) | |
| *A63B 102/32* | (2015.01) | |

(52) U.S. Cl.
CPC ............ *G06V 10/764* (2022.01); *G06V 20/64* (2022.01); *A63B 2024/0034* (2013.01); *A63B 2102/32* (2015.10); *A63B 2220/05* (2013.01); *A63B 2220/807* (2013.01); *G06T 2207/30224* (2013.01)

(58) Field of Classification Search
CPC ................ A63B 71/06; A63B 71/0622; A63B 2024/0028; A63B 2024/0053; A63B 2024/0056; A63B 2102/18; A63B 2220/806; A63B 2225/15; G06T 7/215; G06T 7/285; G06T 2207/30224; G06T 2207/10021; G06T 2207/30241; G06T 7/11; G06T 7/20; G06T 7/70; G06V 10/764; G06V 20/64
See application file for complete search history.

(56) References Cited

U.S. PATENT DOCUMENTS

| | | | | |
|---|---|---|---|---|
| 6,093,923 | A * | 7/2000 | Vock .................... | G01S 3/7864 |
| | | | | 250/206.1 |
| 7,292,711 | B2 * | 11/2007 | Kiraly ...................... | G06T 7/70 |
| | | | | 348/169 |
| 7,324,663 | B2 | 1/2008 | Kiraly | |
| 7,497,780 | B2 | 3/2009 | Kiraly | |
| 9,162,132 | B2 * | 10/2015 | Jang ................... | A63B 69/3658 |
| 2004/0032970 | A1 * | 2/2004 | Kiraly ............... | A63B 24/0021 |
| | | | | 382/103 |
| 2005/0012023 | A1 * | 1/2005 | Vock .................... | G01S 3/7864 |
| | | | | 250/206.1 |
| 2005/0074158 | A1 * | 4/2005 | Kaufhold ................. | G06T 5/50 |
| | | | | 382/254 |
| 2006/0008116 | A1 * | 1/2006 | Kiraly ...................... | G06T 7/20 |
| | | | | 382/103 |
| 2007/0298897 | A1 * | 12/2007 | Kiraly ............... | A63B 24/0021 |
| | | | | 473/131 |
| 2007/0298898 | A1 * | 12/2007 | Kiraly ............... | A63B 24/0021 |
| | | | | 473/131 |
| 2008/0039222 | A1 * | 2/2008 | Kiraly ............... | A63B 69/3658 |
| | | | | 473/131 |

| | | | | |
|---|---|---|---|---|
| 2008/0182685 | A1 * | 7/2008 | Marty .................... | A63B 69/38 |
| | | | | 473/407 |
| 2008/0199043 | A1 * | 8/2008 | Forsgren ................. | G06T 7/194 |
| | | | | 382/103 |
| 2012/0106869 | A1 * | 5/2012 | Machitani .......... | H04N 23/6811 |
| | | | | 382/284 |
| 2012/0114184 | A1 * | 5/2012 | Barcons-Palau ........ | G06T 7/246 |
| | | | | 382/107 |
| 2013/0038718 | A1 * | 2/2013 | Nakagome .......... | H04N 25/531 |
| | | | | 348/135 |
| 2013/0039538 | A1 * | 2/2013 | Johnson .................... | G06T 7/20 |
| | | | | 382/103 |
| 2013/0281223 | A1 * | 10/2013 | Lee ..................... | A63B 69/3658 |
| | | | | 473/156 |
| 2013/0316839 | A1 * | 11/2013 | Woo ....................... | A63F 13/213 |
| | | | | 473/156 |
| 2014/0003666 | A1 * | 1/2014 | Park ................... | G09B 19/0038 |
| | | | | 382/103 |
| 2014/0004969 | A1 * | 1/2014 | Jang ........................ | G06T 7/248 |
| | | | | 473/409 |
| 2015/0350606 | A1 * | 12/2015 | Khanfor .............. | H04N 23/667 |
| | | | | 348/157 |
| 2016/0354632 | A1 * | 12/2016 | Kondo .................... | G06V 40/23 |
| 2017/0124388 | A1 * | 5/2017 | Ueda ...................... | G06V 20/42 |
| 2017/0134644 | A1 * | 5/2017 | Ueda ...................... | H04N 23/66 |
| 2018/0136306 | A1 | 5/2018 | Kim | |
| 2018/0221746 | A1 | 8/2018 | Joo et al. | |
| 2018/0322641 | A1 * | 11/2018 | Ueda ........................ | H04N 7/18 |
| 2019/0015699 | A1 * | 1/2019 | Joo ..................... | A63B 24/0003 |
| 2019/0022487 | A1 * | 1/2019 | Joo ........................ | A63B 60/46 |
| 2019/0358491 | A1 * | 11/2019 | Kwon ............... | A63B 24/0006 |
| 2020/0013312 | A1 * | 1/2020 | Pregizer ............ | G09B 19/0038 |
| 2021/0233326 | A1 * | 7/2021 | Li .............................. | G06T 7/74 |
| 2021/0258496 | A1 * | 8/2021 | Yoshida .............. | H04N 21/431 |
| 2022/0088455 | A1 * | 3/2022 | Wang ..................... | G06T 7/168 |
| 2023/0405432 | A1 * | 12/2023 | Chang ..................... | G06T 7/73 |
| 2024/0119603 | A1 * | 4/2024 | Wang .................... | G06V 20/42 |
| 2024/0157218 | A1 * | 5/2024 | Chang .................... | G06T 7/246 |
| 2024/0382804 | A1 * | 11/2024 | Chang .................. | G06V 10/764 |
| 2024/0420339 | A1 * | 12/2024 | Mackeprang ........ | H04N 23/667 |
| 2024/0420346 | A1 * | 12/2024 | Messina ................. | G06T 7/251 |
| 2024/0422440 | A1 * | 12/2024 | Narfason .............. | H04N 23/60 |

FOREIGN PATENT DOCUMENTS

| | | | |
|---|---|---|---|
| KR | 10-2016-0146266 | A | 12/2016 |
| KR | 10-2018-0014141 | A | 2/2018 |
| KR | 10-2018-0054279 | A | 5/2018 |
| KR | 10-2019-0085152 | A | 7/2019 |

* cited by examiner

FIG. 2

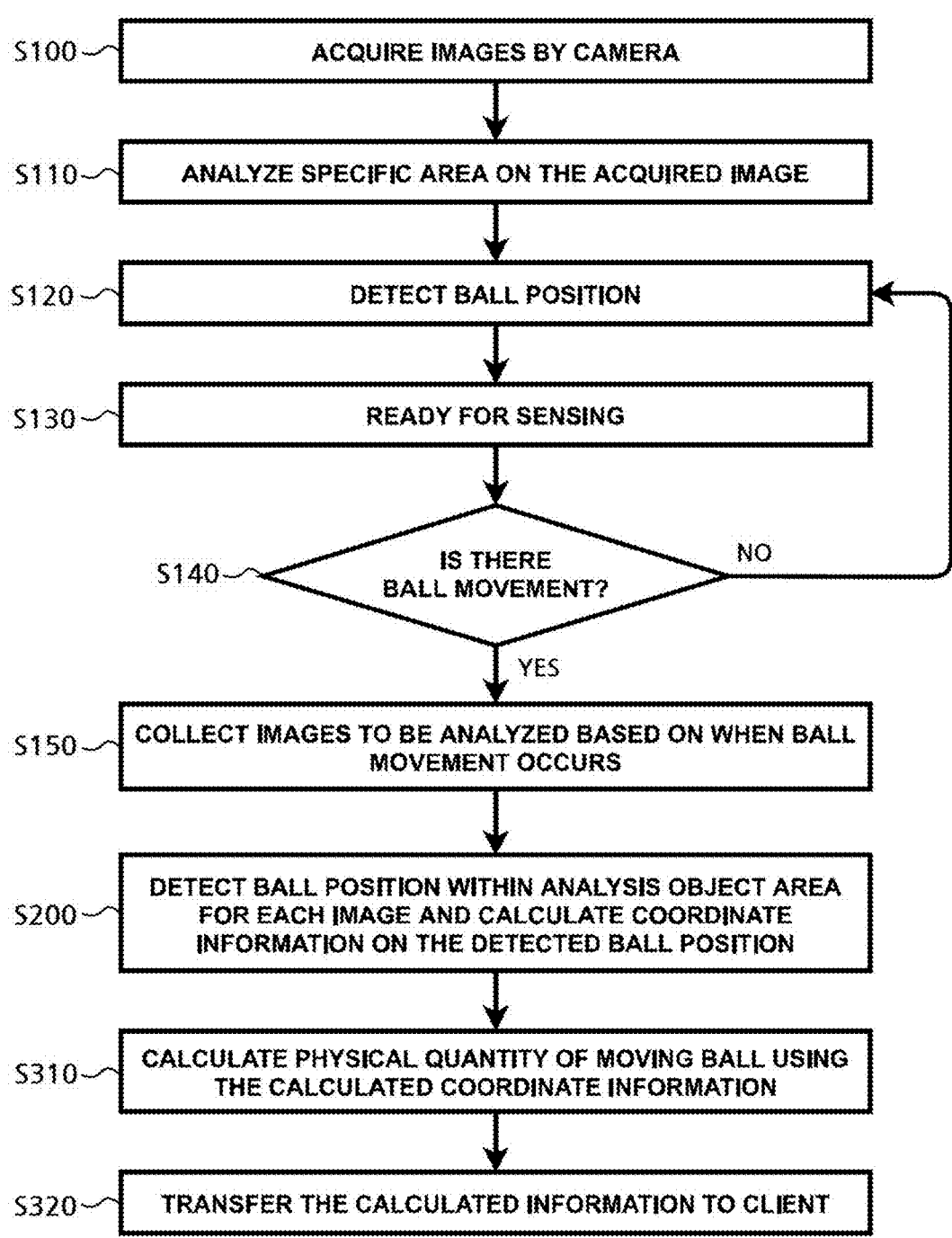

S100 — ACQUIRE IMAGES BY CAMERA

S110 — ANALYZE SPECIFIC AREA ON THE ACQUIRED IMAGE

S120 — DETECT BALL POSITION

S130 — READY FOR SENSING

S140 — IS THERE BALL MOVEMENT?          NO

YES

S150 — COLLECT IMAGES TO BE ANALYZED BASED ON WHEN BALL MOVEMENT OCCURS

S200 — DETECT BALL POSITION WITHIN ANALYSIS OBJECT AREA FOR EACH IMAGE AND CALCULATE COORDINATE INFORMATION ON THE DETECTED BALL POSITION

S310 — CALCULATE PHYSICAL QUANTITY OF MOVING BALL USING THE CALCULATED COORDINATE INFORMATION

S320 — TRANSFER THE CALCULATED INFORMATION TO CLIENT

FIG. 3

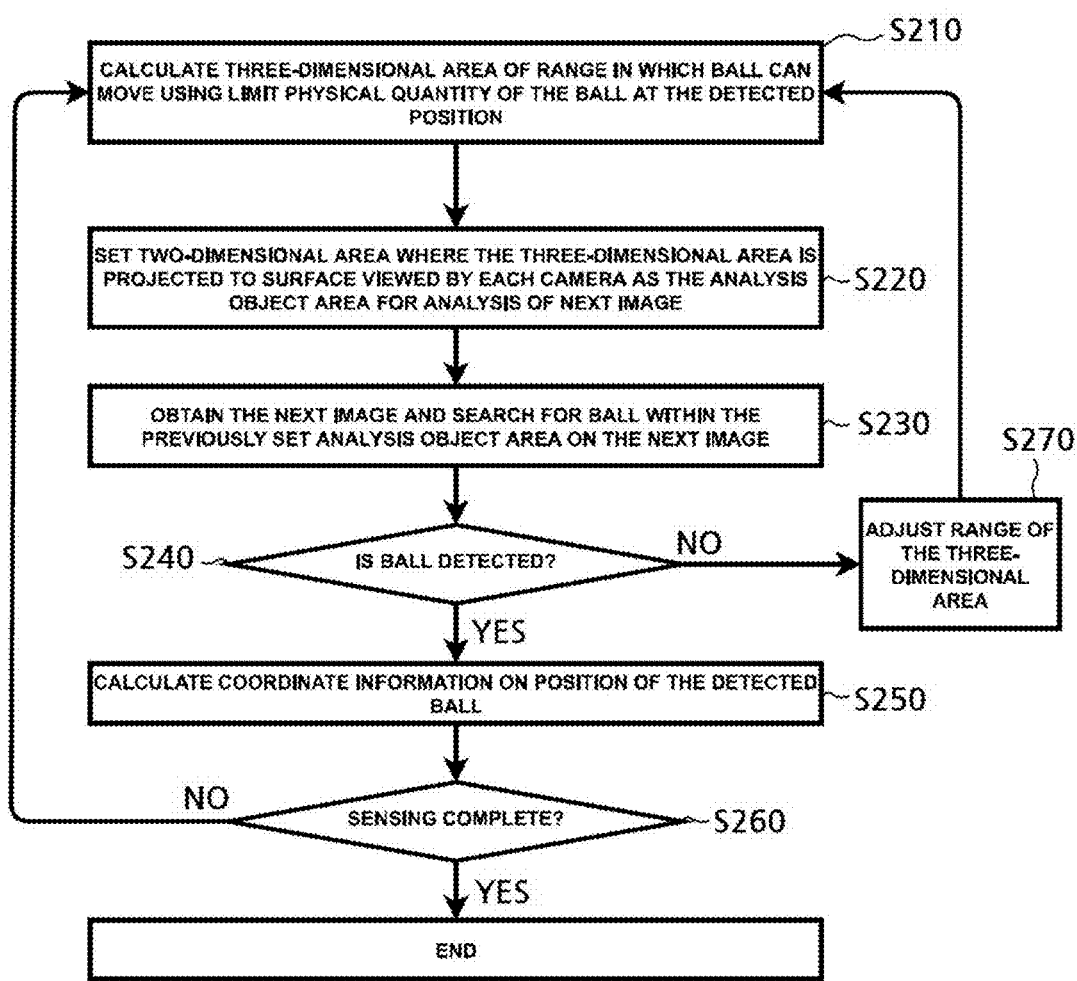

S210

CALCULATE THREE-DIMENSIONAL AREA OF RANGE IN WHICH BALL CAN MOVE USING LIMIT PHYSICAL QUANTITY OF THE BALL AT THE DETECTED POSITION

SET TWO-DIMENSIONAL AREA WHERE THE THREE-DIMENSIONAL AREA IS PROJECTED TO SURFACE VIEWED BY EACH CAMERA AS THE ANALYSIS OBJECT AREA FOR ANALYSIS OF NEXT IMAGE — S220

OBTAIN THE NEXT IMAGE AND SEARCH FOR BALL WITHIN THE PREVIOUSLY SET ANALYSIS OBJECT AREA ON THE NEXT IMAGE — S230

S270

S240 — IS BALL DETECTED? — NO → ADJUST RANGE OF THE THREE-DIMENSIONAL AREA

YES

CALCULATE COORDINATE INFORMATION ON POSITION OF THE DETECTED BALL — S250

NO — SENSING COMPLETE? — S260

YES

END

1

IMAGE ANALYSIS METHOD FOR SENSING MOVING BALL, AND SENSING DEVICE USING SAME

CROSS REFERENCE TO PRIOR APPLICATIONS

This application is the 35 U.S.C. 371 national stage of international application PCT/KR2022/009932 filed on Jul. 8, 2022 which claims priority to Korean Patent Application No. 10-2021-0096145 filed on Jul. 22, 2021. The entire contents of each of the above-identified applications are hereby incorporated by reference.

TECHNICAL FIELD

The present invention is related to a sensing device and a method for analyzing an image captured by a camera for sensing a ball moving as a player hits the ball in a field of sports with balls.

BACKGROUND ART

Recently, virtual simulation systems for sports that are very restrictive to play directly on the field, such as golf and baseball, have become widely popular.

Furthermore, virtual sports simulation systems for net sports, in which both players exchange balls with each other over nets such as tennis, squash, and badminton, are also emerging, making it easier for users to enjoy various sports in popular cultural spaces.

In such a virtual sports simulation, the game is basically played while the player hits the ball, and for simulation on the image of the ball hit by the player, a sensing device capable of effectively sensing the moving ball is required.

In the past, light sensing methods such as infrared sensors and laser sensors were often used, but since a structure equipped with a number of optical sensors to irradiate and receive light must be installed on the player's play space, the player's play was limited and there was a limit to realizing realistic play. In addition, there was a problem that the sensor's structure was frequently damaged during the play process, and above all, there was a problem that the accuracy of sensing was very low.

Due to the limitations and problems of this light sensing method, an image sensing device that acquires a camera image of a moving ball and calculates sensing information of a moving ball through analysis of the acquired image has been widely used.

This image sensing method has the advantage of obtaining fairly accurate sensing information because it analyzes images to obtain sensing information, but since each image of tens to hundreds of frames per second must be processed, there was a problem that it was necessary to have a camera device and a data processing device with quite high data processing capability.

In this regard, prior arts such as Korean patent publication No. 10-2018-0054279, Korean patent publication No. 10-2019-0085152, U.S. Pat. Nos. 7,497,780 and 7,324,663 are disclosed.

The above prior arts commonly disclose a method of analyzing an image based on a region of interest according to designating a peripheral area in which the ball exists in an image including a ball captured by a camera as the region of interest.

The prior art as described above predicts the position where the ball moves through the acquired image and designates a predetermined area around the predicted position as the region of interest. However, in order to predict the position where the ball moves, it is necessary to calculate the physical quantity of the previous ball movements and perform another complex operation to predict the position where the ball moves using the calculated physical quantity, so prior arts have a problem that they have to go through a complicated process to set the region of interest for the ball on the image.

Even if the region of interest is set through such a complex process, there is also a problem that the ball cannot be detected on the region of interest if the calculation for predicting the movement location is insufficient or the prediction is wrong.

PRIOR ART

Korean Patent Publication No. 10-2018-0054279
Korean Patent Publication No. 10-2019-0085152
U.S. Pat. No. 7,497,780
U.S. Pat. No. 7,324,663

DISCLOSURE

Technical Problem

It is an object of the present invention to provide an image analysis method for sensing moving ball, and sensing device using same significantly improving the speed of image processing by performing image analysis by applying an analysis object area set immediately before each acquired image to the current image according to a method that setting an analysis object area, which is a partial area, without analyzing the entire image in analyzing an image for sensing a moving ball in sports with balls, detecting the ball within the set analysis object area, calculating the physical quantity of the ball movement, and setting another analysis object area to include the position where the ball will appear on the image to be analyzed based on the position of the ball detected on the image being analyzed.

Technical Solution

In accordance with an aspect of the present invention, the above and other objects can be accomplished by the provision of an image analysis method for sensing moving ball performed by a sensing device, comprising: acquiring an image in a field of view of a camera facing a space where a ball moves; detecting a position of the ball from the acquired image; setting an analysis object area to include a position where a ball will appear on a next image based on the detected position of the ball; and detecting the position of the ball within the set analysis object area on the next image of the image used to set the analysis object area.

Preferably, the method further comprises: setting a new analysis object area to include a position where a ball will appear on a next image based on the position of the ball detected within the analysis object area set on the previous image; and detecting the position of the ball within the new analysis object area on the next image.

Preferably, wherein the detecting the position of the ball within the set analysis object area on the next image includes: calculating a three-dimensional area of the range in which the ball can move using information preset as a limit physical quantity by which the ball can move at the detected position of the ball; and setting an area including a part projected from a three-dimensional area of the range in which the ball can move to a surface viewed by the camera as the analysis object area.

Preferably, wherein the acquiring the image by the camera includes acquiring images by each of the plurality of stereoscopic-type cameras interconnected with each other, and wherein detecting the position of the ball within the set analysis object area on the next image includes: calculating a three-dimensional area of the range in which the ball can move using information preset as a limit physical quantity by which the ball can move at the detected position of the ball; and setting each area including a part projected from each three-dimensional area of the range in which the ball can move to the surface viewed by each of the plurality of cameras, as an analysis object area for each camera image.

Preferably, wherein a three-dimensional area of the range in which the ball can move is calculated by reflecting information on a change in a relative positional relationship between the moving ball and the camera for each acquired image, and the analysis object area is calculated and set from the calculated three-dimensional area.

Preferably, wherein a change in a relative positional relationship between the moving ball and the camera is calculated in advance, a constant three-dimensional area having a size that includes both the current ball position and the ball position in the next image is preset at any position, and the analysis object area is calculated and set from the constant three-dimensional area based on the ball position for each acquired image.

Preferably, wherein the limit physical quantity that the ball can move is preset for each type of golf club that hits the ball, and wherein the calculating the three-dimensional area of the range in which the ball can move includes, identifying a type of the golf club in which the user hits the ball, and calculating the three-dimensional area of the range in which the ball can move by applying the limit physical quantity according to the identified golf club type.

In accordance with another aspect of the present invention, there is provided a sensing device that senses a moving ball through image analysis of the ball that is hit and moved, comprising: a camera device that acquires images in a field of view toward a space where the ball moves; and a sensing processor that detects a position of the ball from the acquired images, sets an analysis object area to include a position where a ball will appear on a next image based on the detected position of the ball, and by detecting the position of the ball within the set analysis object area on the next image of the image used to set the analysis object area, performs image analysis for sensing the ball only within the set analysis object area for each acquired image.

Preferably, wherein the sensing processor is configured to calculate a three-dimensional area of the range in which the ball can move by using information preset as a limit physical quantity by which the ball can move at the detected position of the ball, and set an area including a part projected from the three-dimensional area of the range in which the ball can move to a surface viewed by the camera device as the analysis object area.

Preferably, wherein the sensing processor is configured to newly calculate and set the analysis object area for each position of the ball by calculating the three-dimensional area of the range in which the ball can move by reflecting information on a change in a relative positional relationship between the moving ball and the camera for each acquired image.

Preferably, wherein the sensing processor is configured to calculate a change in a relative positional relationship between the moving ball and the camera in advance, set an area of a size that can be used at any position in the field of view of the camera device as the analysis object area, and collectively apply the preset analysis object area to the image to be analyzed.

Advantageous Effects

The image analysis method for sensing moving ball, and sensing device using same according to the present invention have an advantageous effect that the speed of image processing can be significantly improved by performing image analysis by applying an analysis object area set immediately before each acquired image to the current image according to a method that setting an analysis object area, which is a partial area, without analyzing the entire image in analyzing an image for sensing a moving ball in sports with balls, detecting the ball within the set analysis object area, calculating the physical quantity of the ball movement, and setting another analysis object area to include the position where the ball will appear on the image to be analyzed based on the position of the ball detected on the image being analyzed.

DESCRIPTION OF DRAWING

FIG. 2 is a flowchart showing a sensing method of the device for sensing a moving ball according to an embodiment of the present invention.

FIG. 3 is a flowchart showing more specifically an image analysis method according to an embodiment of the present invention in the flowchart shown in FIG. 2.

BEST MODE

An image analysis method for sensing moving ball, and sensing device using same according to the present invention will be more specifically described with reference to the drawings.

Figure 1:
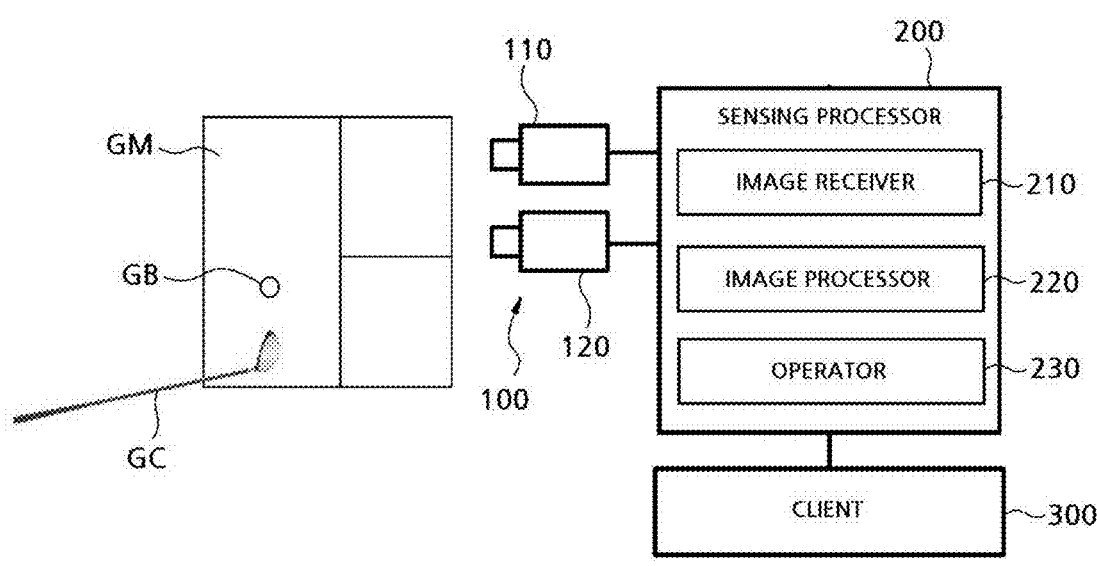
FIG. 1 is a block diagram showing configurations of a device for sensing a moving ball according to an embodiment of the present invention.

First, a configuration of a device for sensing a moving ball according to an embodiment of the present invention is described with reference to FIG. 1. FIG. 1 is a block diagram showing configurations of a device for sensing a moving ball according to an embodiment of the present invention.

The sensing device and the image analysis method used same according to the present invention, whether it is a single camera method or a stereoscopic method linked with multiple cameras, can analyze images capturing the movement of the ball by camera(s) to calculate coordinate information of the ball position in a real space, and calculate various physical quantities related to the movement of the ball, such as the speed of the ball, the direction angle of the ball, and the spin of the ball, based on the calculated information. The present invention is applicable to sports using balls, such as golf, baseball, tennis, squash, and bowling.

In the present specification, among various sports using balls as described above, a sensing device used in a golf field is described as an example, however the technology applied to the sensing device used in the golf field may be equally applied to other sports.

FIG. 1 is a block diagram showing the configuration of a sensing device that senses a ball moving as a user puts a ball GB on a golf mat GM and hits the ball GB with a golf club GC in a so-called screen golf system.

As shown in FIG. 1, the sensing device for sensing the ball according to an embodiment of the present invention may acquire images of a moving ball as the user hits the ball GB with a golf club GC, and analyze the acquired images to calculate the three-dimensional coordinates of the ball moving in space and information on motion characteristics such as the initial speed, direction angle, and height angle of the ball based on the three-dimensional coordinate information.

The sensing device may be applied to various fields such as analysis of a ball that is hit and moves or virtual golf using a virtual reality-based simulation according to a user's golf swing.

The sensing device according to an embodiment of the present invention may include a camera device 100 and a sensing processor 200 as shown in FIG. 1.

The camera device 100 may be configured to consecutively acquire images in a field of view including a moving golf ball, and in order to calculate position information on the three-dimensional space for a moving golf ball, it is preferable that a plurality of cameras, for example, the first camera 110 and the second camera 120, which acquire images for the same object at different field of views, are synchronized with each other and configured in a stereoscopic manner, as shown in FIG. 1.

By configuring the camera device of the sensing device in a stereoscopic manner in which the plurality of cameras 110 and 120 are synchronized with each other as described above, the two-dimensional information of the corresponding golf ball extracted from the image acquired through the first camera 110 and the image acquired through the second camera 120 for the same object may be converted into three-dimensional information.

As shown in FIG. 1, the sensing processor 200 may include an image receiver 210 that collects images from each of the plurality of cameras 110 and 120, an image processor 220 that detects a ball from each image by performing necessary image processing on the images collected by the image receiver 210, and an operator 230 that calculates three-dimensional position information from the two-dimensional position information of the ball detected from each image and is responsible for various operations for sensing.

The sensing processor 200 of the sensing device according to an embodiment of the present invention detects a moving ball from each of the images collected through each of the cameras 110 and 120, calculates the position information of the detected ball, and transmits the calculated position information to a client 300, allowing the client 300 to perform its own functions, such as calculating new information or calculating analysis information using the transmitted position information of the ball.

For example, if the client 300 is implemented as a simulator used in a screen golf system, the client may receive position information of a golf ball and a golf club from the sensing processor 200 to implement a simulation image of the trajectory of a virtual golf ball flying on a virtual golf course in the simulation image.

If the client 300 is implemented as a golf swing analysis device, the client may receive position information of a golf ball and a golf club from the sensing processor 200 to provide analysis information on the user's golf swing, diagnosis of swing problems, and lesson information to solve the problems.

The image processor 220 may be configured to perform image processing to obtain a difference image between a reference image and each of the images consecutively acquired by the cameras 110 and 120, and the operator 230 may be configured to calculate position information of a moving ball from the image processed by the image processor.

In addition to the method of using the difference image as described above as a method of detecting a moving ball from the acquired image, a template image for the ball may be prepared and the golf ball may be extracted through similarity with the template image for the ball on each acquired image.

Meanwhile, the camera device 100 of the sensing device according to an embodiment of the present invention as described above acquires images in a field of view including a space in which the ball moves, and the sensing processor 200 may detect a position of a ball from the acquired images and set an analysis object area to include a position at which a ball will appear on the next frame image based on the ball position detected by the sensing processor in the current frame image. Subsequently, when the sensing processor detect a position of a ball from the next frame image, the position of the ball in the next frame image may be detected within the previously set analysis object area on the next frame image. In this way, image analysis for sensing the ball may be performed only within the analysis object area set for each acquired image frame.

As described above, when the sensing processor 200 analyzes the images acquired by the camera device, the data processing speed may be significantly improved because the position information of the ball is calculated by analyzing only the analysis object area corresponding to a partial area of the entire image without analyzing the entire image.

Meanwhile, the image analysis method for sensing a moving ball according to an embodiment of the present invention will be described with reference to FIGS. 2 and 3.

FIG. 2 is a flowchart showing a sensing method of the device for sensing a moving ball according to an embodiment of the present invention, and FIG. 3 is a flowchart showing more specifically an image analysis method according to an embodiment of the present invention in the flowchart shown in FIG. 2.

As shown in FIG. 2, as the sensing device operates, the camera device acquires images in a field of view toward the space where the ball moves (S100).

The sensing processor may analyze a specific area on the acquired image (S110) and detect the position of the ball in the specific area on the image (S120).

For example, in the case of golf, since golf balls are always hit at a predetermined position such as a golf mat, if the location information of the golf mat is preset, the location of the golf mat can be specified on the image, and the initial ball position can be easily detected by examining an area including the specified location of the golf mat. For other sports, such as baseball, the initial position of the ball can be easily detected in the same way.

Meanwhile, as the sensing processor detects the position of the ball, the sensing device is in a sensing ready state for the ball (S130), and by detecting the position where the ball is placed through the consecutively acquired images, whether the ball is hit and moved can be sensed.

As a result of detection of the ball, when ball movement occurs (S140), (i.e., when the ball hits and starts to move), the sensing processor may specify the time when the ball movement occurs, and images acquired before that time and images acquired after that time may be collected as objects to be analyzed (S150).

For example, it is possible to analyze how the golf club moves from images before and after the ball movement occurs, and analyze how the ball moves from images on and after the ball movement occurs.

Meanwhile, the sensing processor may set an analysis object area for each image collected as described above, detect a ball position within the analysis object area of each image, and calculate position coordinate information of the ball (S200).

The sensing processor may calculate various physical quantities for the moving ball using the calculated position coordinate information of the ball as described above (S310), and transmit the calculated physical quantities information to the client so that the client implements its own function (S320).

Wherein the sensing device according to an embodiment of the present invention may quickly perform image processing by analyzing an analysis object area that is a partial area of each image without analyzing the entire image for each of the images collected in step S200. A specific process for this is shown in FIG. 3.

As shown in FIG. 3, the sensing processor may calculate a 'three-dimensional area of the range in which a hit ball can move' using information on a limit physical quantity of the ball, that is, the limit of a hit ball to move, at the position of the ball previously detected in step S120 (S210).

The calculated 'three-dimensional area within the range in which a hit ball can move' is projected to the surface viewed by each camera, and in each camera, a two-dimensional area including the projected part may be set as an analysis object area for the next frame image (i.e., the next frame image to be analyzed after analyzing the current image frame) (S220).

The sensing processor may obtain the next frame image, and detect whether there is a ball in a previously set analysis object area on the obtained image (S230). That is, since the ball is detected only within the previously set analysis object area, not the entire image, data processing speed may be significantly improved.

When a ball is detected in the analysis object area (S240), the sensing processor may calculate position coordinate information of the detected ball (S250). That is, each camera may convert each analysis object area in each image into position coordinate information on a space (three-dimensional space) by using the position coordinates (two-dimensional coordinates) of the detected ball.

By repeating the processes of steps S210 to S250 until sensing is completed (S260), the analysis object area calculated and set based on the ball position when analyzing the image of the previous frame can be applied to the current frame image analysis to calculate the ball position coordinate information by analyzing only the analysis object area set through the previous frame image in the current frame image.

When the ball is not detected even though the ball is searched within the analysis object area (S240), the range of the 'three-dimensional area of the range in which a hit ball can move' may be adjusted (S270), and the analysis object area may be calculated and set again based on the adjusted range.

As such, the present invention can greatly improve the data processing speed because it only needs to analyze the previously set analysis object area in the current analysis image by projecting the 'three-dimensional area of the range in which the ball can move' derived using the limit physical quantity at which the ball can move based on the ball position detected from the previous frame image as a two-dimensional area and applying the set analysis object area to the current analysis image.

More detailed description of the calculation and setting of the 'analysis object area' as described above will be described with reference to FIGS. 4 to 7.

Figure 4:
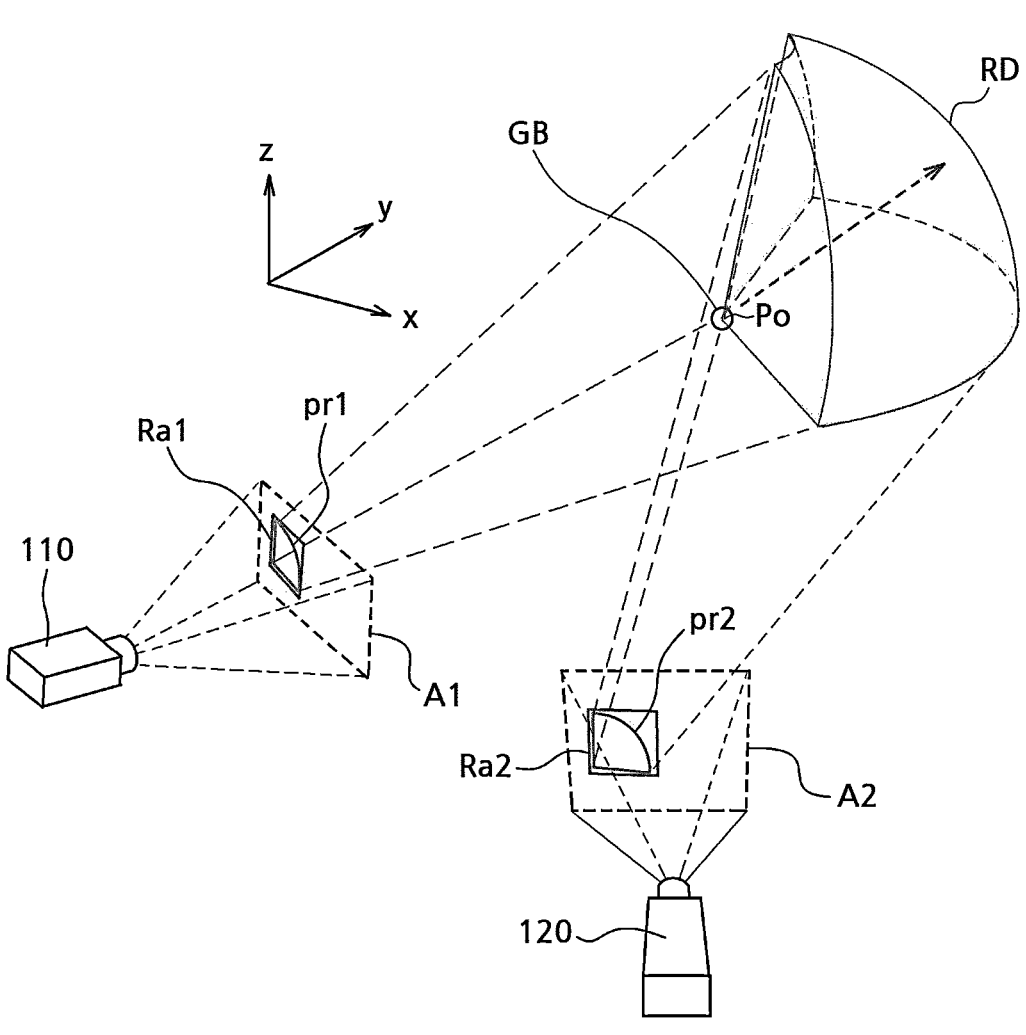
FIG. 4 shows the derivation of a three-dimensional area of a range in which the ball can move using a limited physical amount by which the ball can move based on the ball position and the calculation of an analysis object area by projecting the three-dimensional area on a surface viewed by each camera, according to an image analysis method for sensing a moving ball according to an embodiment of the present invention.

FIG. 4 shows that according to an image analysis method for sensing a moving ball according to an embodiment of the present invention, a three-dimensional area in which the ball can move is derived using the limit physical quantity by which the ball can move based on the position of the ball detected in the image, and the derived three-dimensional area is projected onto the surface viewed by each camera to calculate the analysis object area.

As shown in FIG. 4, a three-dimensional area RD of a range in which the ball can move may be derived using the position Po of the ball GB analyzed in the current image, that is, the position on a three-dimensional space.

The above-described 'three-dimensional area RD of the range in which the ball can move' is a calculated area as a three-dimensional area of a range including a position of a ball that can be detected on the next frame image based on the position of the ball detected on the current frame image.

This three-dimensional area can be calculated using the ball's limit physical quantity, for example, the above limit physical quantity can be calculated using the maximum speed of a sports ball that human can make and the frame rate of the camera.

For example, the maximum speed of a ball that human can make in the case of golf as recorded in the Guinness Book of World Records is 97 m/s. If this can be set to 100 m/s and the frame rate of the camera is 500 frames per second, the distance at which the ball may move between one frame of the camera image can be 0.2 m. Based on the position of the ball on the previous frame image, the ball on the next frame image inevitably exists in a sphere having a radius of 0.2 m.

The sphere based on the ball position as described above may be effectively limited by reflecting characteristics of a sport in which a sensing device is used.

For example, the ball hit by a golf shot has a constant flying direction, so the rear hemisphere of the sphere can be excluded, and the flying ball rises with a certain launch angle, so it is not necessary to consider the lower equator of the sphere. (if the ball can travel slightly downward on the tee in the case of a tee shot, it can include parts within a certain angular range below the equator of the sphere).

In this way, by clearly limiting the sphere based on the ball position as described above to an area where the ball is bound to exist on the next image, it can be derived as the 'three-dimensional area RD of the range in which the ball can move', and what the RD shown in FIG. 4 refers to is an example of the 'three-dimensional area of the range in which the ball can move'. The three-dimensional area RD of the range in which the ball shown in FIG. 4 can move shows an example calculated as a three-dimensional area corresponding to approximately ¼ of the sphere based on the position Po of the ball.

When the 'three-dimensional area RD in the range in which the ball can move' is calculated in this way, the three-dimensional area RD is projected onto the surfaces A1 and A2 viewed by each camera 110 and 120 to calculate the two-dimensional projection parts pr1 and pr2, respectively.

As shown in FIG. 4, the two-dimensional area including the two-dimensional projection parts pr1 and pr2 may be set as analysis object areas Ra1 and Ra2 for each camera, and when analyzing the next frame image, a ball on the next frame image may be detected by applying the analysis object areas Ra1 and Ra2 to detect within the area.

An example of a process of detecting a ball using the analysis object area in the above-described manner is described with reference to FIGS. 5 and 6.

Figure 5:
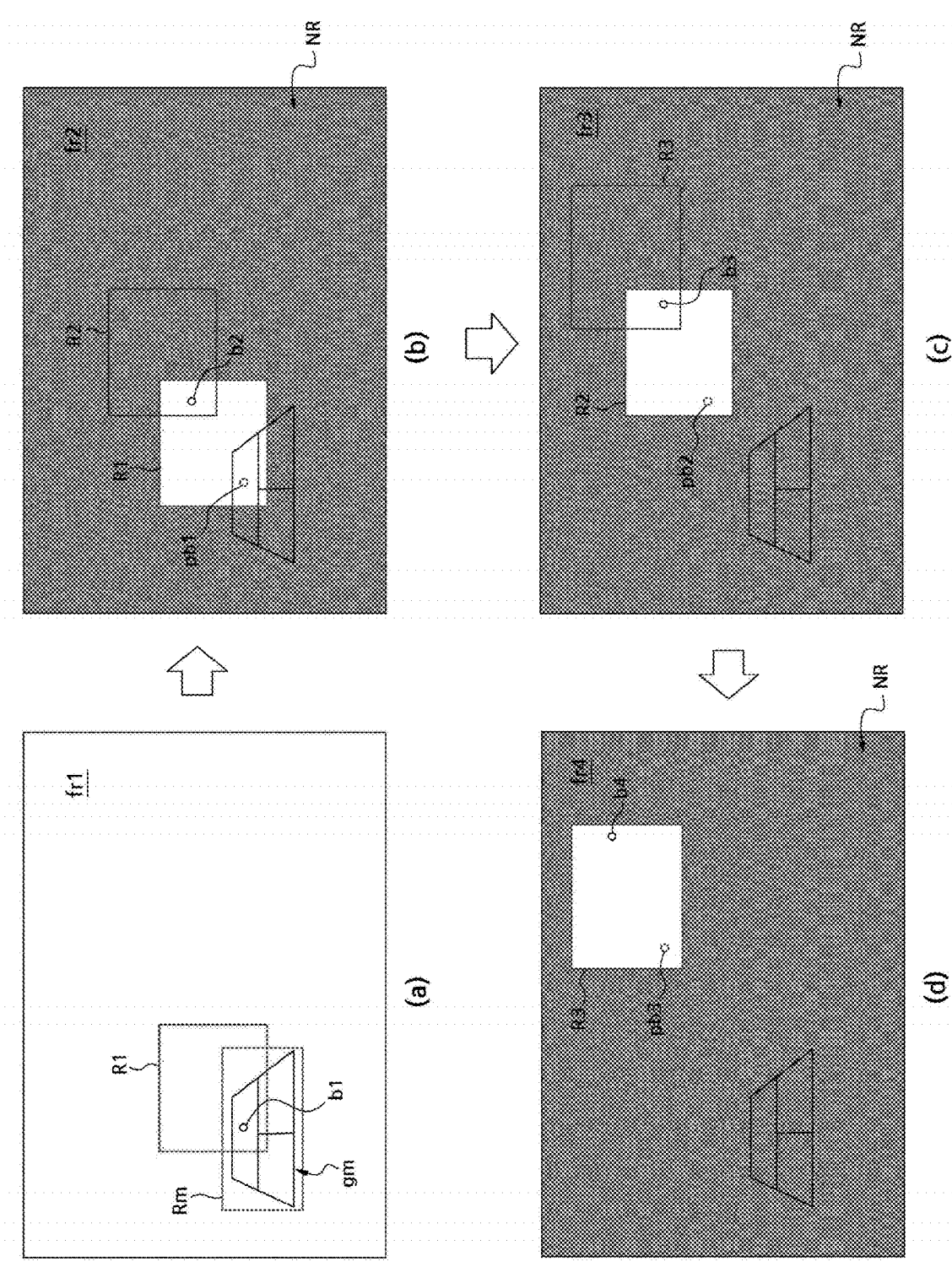
FIGS. 5 and 6 show examples of a process of detecting a ball using an analysis object area by an image analysis method according to an embodiment of the present invention.

FIGS. 5(*a*) to 5(*d*) show a process in which the sensing processor of the sensing device according to an embodiment of the present invention obtains images including fr1 to fr4 as images to be analyzed and analyzes the images respectively. FIG. 6 is a diagram for explaining the calculation of the 'three-dimensional area in which the ball can move' for setting the analysis object area in the analysis process shown in FIG. 5. FIGS. 5(*a*) to 5(*d*) show images acquired by one of the plurality of cameras.

FIG. 5(*a*) shows an image fr1 acquired by the camera while a ball is placed on the golf mat and processed by the sensing processor. At the beginning of sensing, a specific region of interest may be set to find a ball on the image.

Since a golf ball always starts on the golf mat, the ball on the image can be detected by searching for the ball within the region of interest based on the position of the golf mat preset when the image is acquired.

Referring to FIG. 5(*a*), since the part gm corresponding to the golf mat is a part in which the location information is already known, a region of interest Rm of a predetermined size is set based on this, and the ball b1 may be detected in the region of interest Rm.

Figure 6:
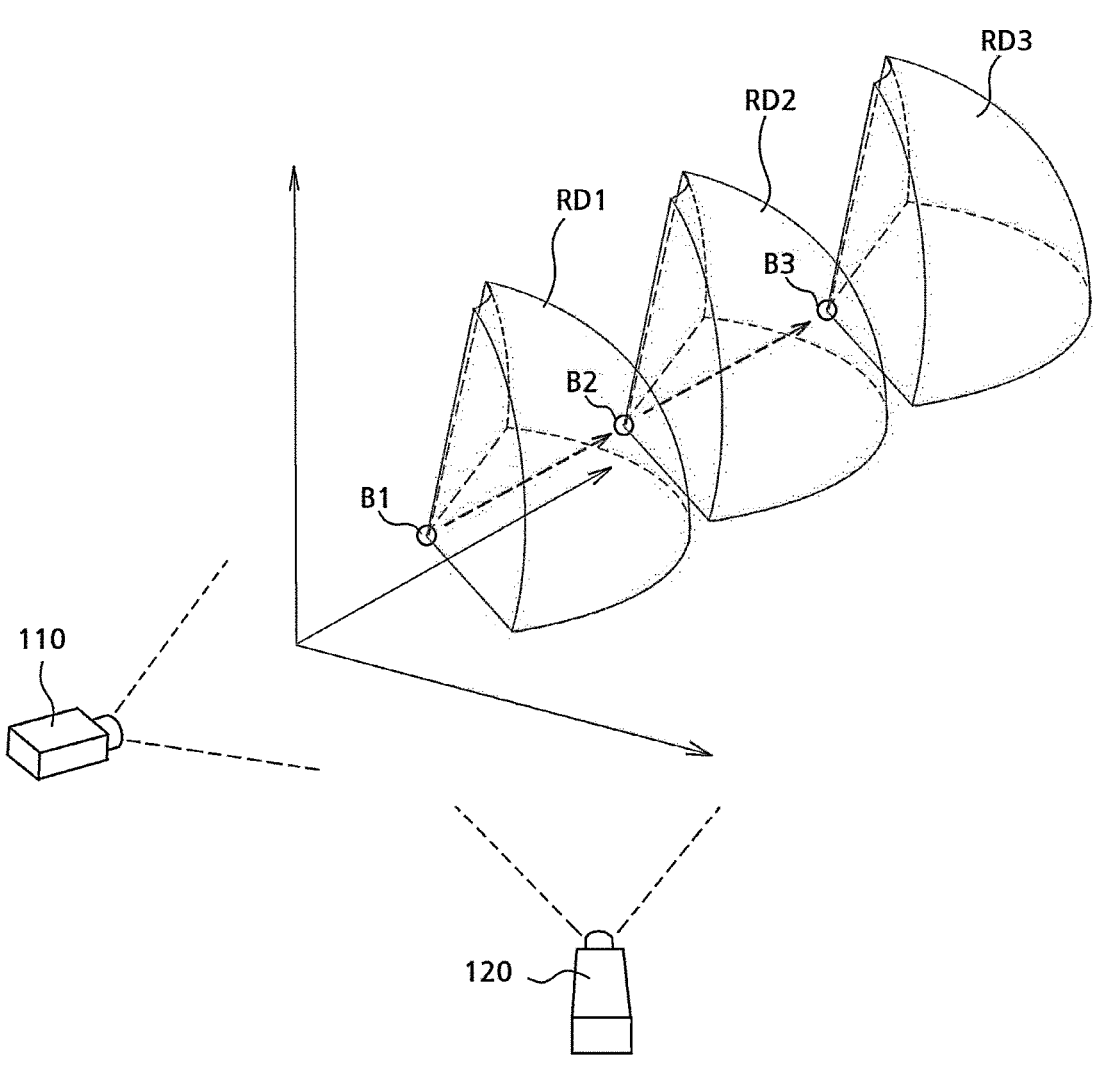

The ball b1 on the image detected as described above may be calculated as coordinate information in the three-dimensional space, and exists in the three-dimensional space as shown in FIG. 6. That is, the ball b1 on the image detected in FIG. 5(*a*) corresponds to the ball B1 on the three-dimensional space as shown in FIG. 6.

In the three-dimensional space shown in FIG. 6, a 'three-dimensional area RD1 of the range in which the ball can move' based on the ball position B1 can be calculated by applying the limit physical quantity in which the ball can move, and the three-dimensional area RD1 is projected to the surface viewed by each of the cameras 110 and 120 to calculate the analysis object area R1 as shown in FIG. 5(*a*).

The area R1 shown in FIG. 5(*a*) is calculated based on the projected part of the 'three-dimensional area RD1 of the range in which the ball can move' based on the ball position B1, and may be set as the analysis object area for the next frame image.

FIG. 5(*b*) shows the next image fr2 of the fr1 image described above, and the previously set analysis object area R1 is applied, so that the sensing processor may detect the ball b2 by searching in the analysis object area R1 when analyzing the fr2 image, and the remaining area other than the analysis object area R1 is an area NR that is not processed by image processing or data processing.

Wherein pb1 is the position of the ball detected in the previous image fr1, and when the analysis object area R1 is calculated in the fr1 image, both the position of the ball pb1 as the basis for calculating the analysis object area and the position of the ball to be detected in the next image exist in the analysis object area.

As shown in FIG. 5(*b*), the sensing processor may detect the ball b2 by searching inside the analysis object area R1 on the fr2 image, and the position coordinates of the detected ball b2 correspond to the position of the ball B2 on the three-dimensional space shown in FIG. 6.

As shown in FIG. 6, the position of the ball B2 is within the range of the three-dimensional area RD1 of the range in which the ball B1 can move, and in the same way, the three-dimensional area RD2 of the range in which the ball can move can be calculated based on the position of the ball B2.

The above-described 'three-dimensional area RD2 in the range in which the ball can move' is projected to the surface viewed by each of the cameras 110 and 120 to calculate the analysis object area R2 as shown in FIG. 5(*b*).

The R2 area shown in FIG. 5(*b*) is calculated using the projection of the 'three-dimensional area RD2 of the range in which the ball can move' based on the position of the ball B2, and may be set as an analysis object area for the next image.

FIG. 5(*c*) shows the next image fr3 of the fr2 image. The previously set analysis object area R2 is applied, so that when analyzing the image fr3, the sensing processor may detect the ball b3 by searching inside the analysis object area R2, and the remaining area other than the analysis object area R2 is a region NR in which image processing or data processing is not performed.

Wherein, pb2 is the position of the ball detected in the previous image fr2, and when the analysis object area R2 is calculated in the fr2 image, both the position of the ball as a reference (pb2) and the position of the ball to be detected in the next image exist in the analysis object area.

As shown in FIG. 5(*c*), the sensing processor may detect ball b3 by searching inside the analysis object area R2 on the fr3 image, and the position coordinates of the detected ball b3 correspond to the position of ball B3 on the three-dimensional space shown in FIG. 6.

As shown in FIG. 6, the position of the ball B3 is within the range of the three-dimensional area RD2 of the range in which the previous ball can move, and in the same way, the three-dimensional area RD3 of the range in which the ball can move can be calculated based on the position of the ball B3.

The above-described 'three-dimensional area RD3 in the range in which the ball can move' is projected to the surface viewed by each of the cameras 110 and 120 to calculate the analysis object area R3 as shown in FIG. 5(*c*).

The R3 area shown in FIG. 5(*c*) is calculated using the projection of the 'three-dimensional area RD3 of the range in which the ball can move' based on the position of the ball B3, and may be set as an analysis object area for the next image.

FIG. 5(*d*) shows the next image fr4 of the fr3 image. The previously set analysis object area R3 is applied, so that when analyzing the fr4 image, the sensing processor may detect the ball b4 by searching inside the analysis object area R3, and the remaining area other than the analysis object area R3 is a region NR in which image processing or data processing is not performed.

Wherein, pb3 is the position of the ball detected in the previous image fr3, and when the analysis object area R3 is calculated in the fr3 image, both the position of the ball as a reference (pb3) and the position of the ball to be detected in the next image exist in the analysis object area.

As shown in FIG. 5(*d*), the sensing processor may detect ball b4 by searching inside the analysis object area R3 on the fr4 image, and the detected coordinates of ball b4 may also be calculated as ball position coordinates in a three-dimensional space.

In this way, the sensing processor may detect ball positions such as b2, b3, and b4 in the images of each camera using the 'analysis object area set in the previous frame image' on each of the image, and may quickly calculate coordinate information of the ball positions in the three-dimensional space using the detected ball positions.

Wherein, the analysis object area as described above may be newly calculated and set under new conditions for each image (applying individually), or an analysis object area of a constant size may be applied to all images to be analyzed (applying collectively).

In the above-described 'applying individually', the sensing processor may newly set and apply the analysis object area for each image by using a distance relationship between a moving ball and the camera when the ball in the real space moves.

Figure 7:
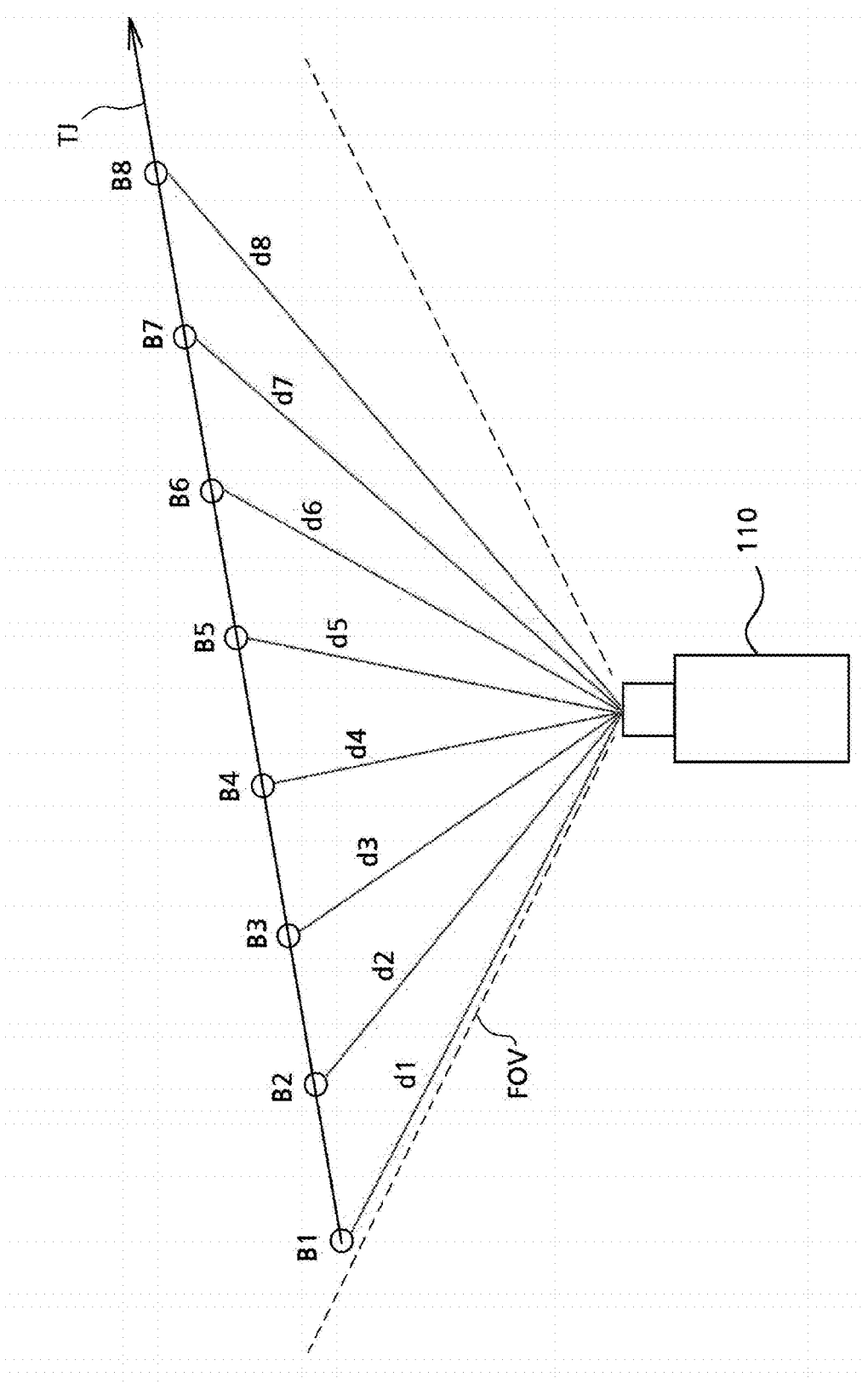
FIG. 7 shows a change in the distance relationship between the real ball and the camera when the real ball moves.

FIG. 7 shows a change in the distance relationship between the ball and the camera 110 when the real ball moves. As shown in FIG. 7, when the ball moves from the B1 position to the B8 position, the distance between the ball and the camera 110 detecting the ball consecutively changes.

As shown in FIG. 7, the distance from the camera 110 at each of the positions B1 to B8 is d1 to d8, and it can be seen that the distance from each of the d1 to d8 is different from each other.

As the distance between the camera and the ball gets closer, the size of the ball appears larger and larger on the camera acquisition image, and the distance between the balls appears further and farther between frames. In addition, as the distance between the camera and the ball increases, the size of the ball appears smaller and smaller on the camera acquisition image, and the distance between the balls appears closer and closer between frames.

Accordingly, even if the same "limit physical quantity of ball movement" is applied to each image, the size of the analysis object area inevitably changes for each image considering the distance relationship between the camera and the ball when the ball moves.

The sensing processor of the sensing device according to an embodiment of the present invention calculates a three-dimensional area of a range in which the ball can move by reflecting information on the change in the relative positional relationship between the moving ball and the camera for each acquired image, and calculates and sets an analysis object area from the calculated three-dimensional area so as to apply an analysis object area having a different size for each image.

Meanwhile, in the case of the above 'applying collectively', the sensing processor can pre-calculate the change in distance between the ball and the camera when the ball moves in real space, define an analysis object area of a constant size that can be applied collectively no matter where the ball is located, and apply the predefined analysis object area collectively for each image.

Wherein the sensing processor can always detect the ball in the analysis object area as shown in FIG. 5 by placing the position of the ball detected for each image in the analysis object area for the 'applying collectively' relatively the same position.

That is, the sensing processor of the sensing device according to one embodiment of the present invention calculates a change in the relative positional relationship between the moving ball and the camera in advance, and presets a constant three-dimensional area with a size that can include both the current ball position on the image and the ball position on the next image at any position (which means that the three-dimensional area does not include the current 'ball' and the 'ball' in the next frame, but is a three-dimensional area with a size or shape that can include both the current 'ball position' and the 'ball position' in the next frame). The sensing processor can calculate and set an analysis object area from a constant three-dimensional area as described above based on the ball position for each acquired image.

Meanwhile, as described above, the analysis object area is calculated from the three-dimensional area of the range in which the ball can move based on the ball position of the previous image, which is calculated based on the limit physical quantity that the ball can move, and the limit physical quantity may vary for each type of sports.

For example, the maximum speed of the golf ball hit by the golf club in golf and the maximum speed of the baseball in baseball are different, and the maximum speed of the ball in tennis is also different. That is, since the maximum speed of the ball that can be generated by humans is different for each sport, the limit physical quantity of the ball can be defined and used for each type of sports.

In addition, since the maximum speed of the ball that can be made for each type of golf club is different, the three-dimensional area and the analysis object area of the ball can be calculated by defining the limit physical quantity of the ball differently for each golf club as described above.

That is, the limit physical quantity that the ball can move can be preset for each type of golf club, and since the sensing device may identify the type of golf club that the user hits the ball, apply the limit physical quantity according to the identified type of golf club to calculate the three-dimensional area of the range where the ball can move as described above, and calculate the analysis object area according to the calculated three-dimensional area, the limit physical quantity that is the basis of the analysis object area may be applied differently for each golf club.

In addition, since the launch angle range of the hit ball is different for each type of golf club, the sensing processor can set the launch angle range differently for each type of golf club and calculate the three-dimensional area and the analysis object area by reflecting the set launch angle range in the definition of the limit physical quantity according to the golf club.

Data on the ball launch angle for each golf club may be arbitrarily set based on the generally known launch angle for each golf club, or from accumulated record data of users' shot data through a virtual golf simulation device, a golf practice device, or a golf analysis device, the maximum launch angle range for each golf club may be selected or the average launch angle range for each golf club may be calculated and used to calculate the above-described limit physical quantity.

As described above, the image analysis method for sensing moving ball, and sensing device using same according to the present invention have an advantageous effect that the speed of image processing can be significantly improved by performing image analysis by applying an analysis object area set immediately before each acquired image to the current image according to a method that setting an analysis object area, which is a partial area, without analyzing the entire image in analyzing an image for sensing a moving ball in sports with balls, detecting the ball within the set analysis object area, calculating the physical quantity of the ball movement, and setting another analysis object area to include the position where the ball will appear on the image to be analyzed based on the position of the ball detected on the image being analyzed.

INDUSTRIAL APPLICABILITY

The image analysis method for sensing moving ball, and sensing device using same according to the present invention can be used in the field of ball sports such as a golf and in the field related to virtual simulation systems that allow users to practice or enjoy ball sports in a virtual environment, such as so-called screen golf that allows users to enjoy golf play based on virtual golf simulations.

The invention claimed is:

1. An image analysis method for sensing moving ball performed by a sensing device, comprising:

acquiring an image in a field of view of a camera facing a space where a ball moves;

detecting a position of the ball from the acquired image;

setting an analysis object area to include a position where a ball will appear on a next image based on the detected position of the ball; and detecting the position of the ball within the set analysis object area on the next image of the image used to set the analysis object area, wherein the detecting the position of the ball within the set analysis object area on the next image includes:

calculating a three-dimensional area of the range in which the ball can move using information preset as a limit physical quantity by which the ball can move at the detected position of the ball; and setting an area including a part projected from a three-dimensional area of the range in which the ball can move to a surface viewed by the camera as the analysis object area.

2. The method according to claim 1, further comprising:

setting a new analysis object area to include a position where a ball will appear on a next image based on the position of the ball detected within the analysis object area set on the previous image; and detecting the position of the ball within the new analysis object area on the next image.

3. The method according to claim 1, wherein a three-dimensional area of the range in which the ball can move is calculated by reflecting information on a change in a relative positional relationship between the moving ball and the camera for each acquired image, and the analysis object area is calculated and set from the calculated three-dimensional area.

4. The method according to claim 1, wherein a change in a relative positional relationship between the moving ball and the camera is calculated in advance, a constant three-dimensional area having a size that includes both the current ball position and the ball position in the next image is preset at any position, and the analysis object area is calculated and set from the constant three-dimensional area based on the ball position for each acquired image.

5. The method according to claim 1, wherein the limit physical quantity that the ball can move is preset for each type of golf club that hits the ball, and wherein the calculating the three-dimensional area of the range in which the ball can move includes, identifying a type of the golf club in which the user hits the ball, and calculating the three-dimensional area of the range in which the ball can move by applying the limit physical quantity according to the identified golf club type.

6. An image analysis method for sensing moving ball performed by a sensing device, comprising:

acquiring an image in a field of view of a camera facing a space where a ball moves;

detecting a position of the ball from the acquired image;

setting an analysis object area to include a position where a ball will appear on a next image based on the detected position of the ball; and detecting the position of the ball within the set analysis object area on the next image of the image used to set the analysis object area, wherein the acquiring the image by the camera includes acquiring images by each of the plurality of stereoscopic-type cameras interconnected with each other, and wherein detecting the position of the ball within the set analysis object area on the next image includes:

calculating a three-dimensional area of the range in which the ball can move using information preset as a limit physical quantity by which the ball can move at the detected position of the ball; and setting each area including a part projected from each three-dimensional area of the range in which the ball can move to the surface viewed by each of the plurality of cameras, as an analysis object area for each camera image.

7. The method according to claim 6, wherein a three-dimensional area of the range in which the ball can move is calculated by reflecting information on a change in a relative positional relationship between the moving ball and the camera for each acquired image, and the analysis object area is calculated and set from the calculated three-dimensional area.

8. The method according to claim 6, wherein a change in a relative positional relationship between the moving ball and the camera is calculated in advance, a constant three-dimensional area having a size that includes both the current ball position and the ball position in the next image is preset at any position, and the analysis object area is calculated and set from the constant three-dimensional area based on the ball position for each acquired image.

9. The method according to claim 6, wherein the limit physical quantity that the ball can move is preset for each type of golf club that hits the ball, and wherein the calculating the three-dimensional area of the range in which the ball can move includes, identifying a type of the golf club in which the user hits the ball, and calculating the three-dimensional area of the range in which the ball can move by applying the limit physical quantity according to the identified golf club type.

10. A sensing device that senses a moving ball through image analysis of the ball that is hit and moved, comprising:

a camera device that acquires images in a field of view toward a space where the ball moves; and a sensing processor that detects a position of the ball from the acquired images, sets an analysis object area to include a position where a ball will appear on a next image based on the detected position of the ball, and by detecting the position of the ball within the set analysis object area on the next image of the image used to set the analysis object area, performs image analysis for sensing the ball only within the set analysis object area for each acquired image, wherein the sensing processor is configured to calculate a three-dimensional area of the range in which the ball can move by using information preset as a limit physical quantity by which the ball can move at the detected position of the ball, and set an area including a part projected from the three-dimensional area of the range in which the ball can move to a surface viewed by the camera device as the analysis object area.

11. The device according to claim 10, wherein the sensing processor is configured to newly calculate and set the analysis object area for each position of the ball by calculating the three-dimensional area of the range in which the ball can move by reflecting information on a change in a relative positional relationship between the moving ball and the camera for each acquired image.

12. The device according to claim 10, wherein the sensing processor is configured to calculate a change in a relative positional relationship between the moving ball and the camera in advance, set an area of a size that can be used at any position in the field of view of the camera device as the analysis object area, and collectively apply the preset analysis object area to the image to be analyzed.

\* \* \* \* \*